United States Patent
Ouyang et al.

(10) Patent No.: US 12,021,232 B2
(45) Date of Patent: Jun. 25, 2024

(54) LITHIUM MANGANATE POSITIVE ELECTRODE ACTIVE MATERIAL AS WELL AS POSITIVE ELECTRODE SHEET, SECONDARY BATTERY, BATTERY MODULE, BATTERY PACK AND POWERED DEVICE COMPRISING THE SAME

(71) Applicant: Contemporary Amperex Technology Co., Limited, Ningde (CN)

(72) Inventors: Shaocong Ouyang, Ningde (CN); Chenghua Fu, Ningde (CN); Tingzhen Xie, Ningde (CN); Dong Pan, Ningde (CN); Yonghuang Ye, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 131 days.

(21) Appl. No.: 17/821,819

(22) Filed: Aug. 24, 2022

(65) Prior Publication Data

US 2023/0006202 A1  Jan. 5, 2023

Related U.S. Application Data

(63) Continuation of application No. PCT/CN2021/090978, filed on Apr. 29, 2021.

(30) Foreign Application Priority Data

Mar. 25, 2021 (CN) .......................... 202110330576.4

(51) Int. Cl.
*H01M 4/505* (2010.01)
*H01M 4/04* (2006.01)
(Continued)

(52) U.S. Cl.
CPC .......... *H01M 4/505* (2013.01); *H01M 4/0416* (2013.01); *H01M 10/0525* (2013.01); *H01M 2004/028* (2013.01)

(58) Field of Classification Search
None
See application file for complete search history.

(56) References Cited

U.S. PATENT DOCUMENTS

2007/0287070 A1  12/2007  Okumura et al.
2021/0083267 A1  3/2021  Lin et al.

FOREIGN PATENT DOCUMENTS

CN  103794751 A  5/2014
CN  105118988 A  12/2015
(Continued)

OTHER PUBLICATIONS

International Search Report received in corresponding Application PCT/CN2021/090978 on Dec. 17, 2021.
(Continued)

*Primary Examiner* — Wyatt P McConnell
(74) *Attorney, Agent, or Firm* — Kilpatrick Townsend & Stockton LLP (57) ABSTRACT

The present disclosure provides a lithium manganate positive electrode active material, comprising a lithium manganate matrix and a cladding layer, where the cladding layer comprises an organic bonding material, one or more A-type salts, and one or more B-type salts. The lithium manganate positive electrode active material of the present disclosure significantly reduces the content of transition metal manganese ions within a battery through combined action of the organic bonding material, the A-type salts, and the B-type salts, thereby slowing down the decomposition and consumption of the SEI film (solid electrolyte interphase) by transition metal manganese, and improving the capacity retention rate and impedance performance of the battery.

15 Claims, 4 Drawing Sheets

(51) Int. Cl.
    *H01M 10/0525*    (2010.01)
    *H01M 4/02*    (2006.01)

(56) References Cited

FOREIGN PATENT DOCUMENTS

| | | |
|---|---|---|
| CN | 105261740 A | 1/2016 |
| CN | 105591097 A | 5/2016 |
| CN | 108878852 A | 11/2018 |
| CN | 111883771 A | 11/2020 |
| EP | 3121874 A1 * | 1/2017 |
| EP | 3121874 A1 | 1/2017 |
| JP | 2011159576 A | 8/2011 |
| JP | 2020136115 A | 8/2020 |
| JP | 2023513389 A | 3/2023 |
| KR | 1020190132496 A | 11/2019 |
| WO | 2016136212 A1 | 9/2016 |

OTHER PUBLICATIONS

First office action received in the corresponding Japanese application 2022-544166, mailed Jul. 18, 2023.
First office action received in the corresponding Chinese application 202110330576.4, mailed May 27, 2023.
The extended European search report received in the corresponding European application 21912311.4, mailed Oct. 31, 2023.
Notice of Preliminary Rejection received in the corresponding Korean application 10-2022-7025352, mailed Apr. 11, 1 2024.

* cited by examiner

LITHIUM MANGANATE POSITIVE ELECTRODE ACTIVE MATERIAL AS WELL AS POSITIVE ELECTRODE SHEET, SECONDARY BATTERY, BATTERY MODULE, BATTERY PACK AND POWERED DEVICE COMPRISING THE SAME

CROSS-REFERENCE TO RELATED APPLICATIONS

The present application is a continuation of International Application PCT/CN2021/090978, filed Apr. 29, 2021, which claims priority to Chinese Patent Application No. 202110330576.4 titled "LITHIUM MANGANATE POSITIVE ELECTRODE ACTIVE MATERIAL AS WELL AS POSITIVE ELECTRODE SHEET, SECONDARY BATTERY, BATTERY MODULE, BATTERY PACK AND POWERED DEVICE COMPRISING THE SAME" submitted on 25 Mar. 2021, the entire contents of which are incorporated herein by reference.

TECHNICAL FIELD

The present disclosure relates to the field of electrochemistry, and in particular to a lithium manganate positive electrode active material and its preparation method as well as a positive electrode sheet, a secondary battery, a battery module, a battery pack and a powered device comprising the same.

BACKGROUND ART

With the rapid development of new energy fields, lithium-ion batteries are widely used in various large power plants, energy storage systems and various consumer products, especially in the field of new energy vehicles such as all-electric vehicles and hybrid electric vehicles by virtue of their excellent electrochemical performance, memoryless effect, less environmental pollution and other advantages.

With the popularization of consumer electronics and new energy vehicles, consumers have put forward higher requirements on the range and service life of lithium-ion batteries. However, the current lithium-ion batteries are difficult to meet the increasing demands, and therefore, it is one of the main lithium-ion battery research and development directions to design a lithium-ion battery with low impedance and high capacity retention rate on the premise of ensuring a lower preparation cost.

Among the commonly used positive electrode active materials for lithium-ion batteries, lithium manganate has become a widely used positive electrode active material for lithium-ion batteries due to its abundant raw materials, simple preparation, low price and high safety. However, during the deep charging and discharging of a lithium-ion battery, the lithium manganate material is prone to lattice distortion and corrosion by hydrofluoric acid in electrolyte solution, so transition metals are prone to dissolution. After charge-discharge cycles of the battery several times, these dissolved transition metals greatly attenuate the electrical performance of the battery, especially the battery impedance and capacity retention rate performance, thereby reducing the range and service life of the battery. Therefore, it is of great significance to develop a lithium manganate material that reduces the precipitation of transition metal manganese.

SUMMARY OF THE INVENTION

The present disclosure has been made in view of the above-mentioned topics, and the objective is to provide a lithium manganate positive electrode active material that reduces the battery impedance and improves the battery capacity retention rate, as well as a positive electrode sheet, a secondary battery, a battery module, a battery pack and a powered device comprising the same. On the premise of low cost advantage, the lithium manganate positive electrode active material of the present disclosure can significantly improve the range and service life of lithium-ion batteries.

An objective of the present disclosure is to provide a lithium manganate positive electrode active material that improves transition metal manganese precipitation.

Another objective of the present disclosure is to provide a lithium manganate positive electrode active material having significantly improved battery capacity retention rate while reducing the battery impedance.

The inventors have found that one or more of the above objectives can be achieved by adopting the technical solutions of the present disclosure.

A first aspect of the present disclosure provides a lithium manganate positive electrode active material. The positive electrode active material comprises a lithium manganate matrix and a cladding layer. The cladding layer clads the lithium manganate matrix, and comprises an organic bonding material, one or more A-type salts, and one or more B-type salts.

In any of embodiments, the organic bonding material is derived from one or more of carboxymethyl cellulose salt, alginate salt, and polyacrylate salt, and optionally is one or more of sodium carboxymethyl cellulose, potassium carboxymethyl cellulose, lithium carboxymethyl cellulose, sodium alginate, potassium alginate, lithium alginate, magnesium alginate, aluminum alginate, sodium polyacrylate, potassium polyacrylate, and magnesium polyacrylate.

In any of embodiments, the organic bonding material is derived from one or more of styrene butadiene rubber, polyacrylic acid, polyacrylamide, polyvinyl alcohol, polymethacrylic acid, and carboxymethyl chitosan, and optionally is one or more of polyvinyl alcohol and carboxymethyl chitosan.

In any of embodiments, the organic bonding material is derived from one or more of the above organic bonding materials.

In any of embodiments, the A-type salt is derived from oxalate, lactate, tartrate, and edetate, optionally is respective alkali metal salts, alkaline earth metal salts, aluminum salts, or ammonium salts of oxalic acid, lactic acid, tartaric acid, and edetic acid, more optionally is potassium oxalate, lithium oxalate, magnesium oxalate, aluminum oxalate, sodium oxalate, sodium lactate, potassium lactate, sodium tartrate, potassium tartrate, sodium edetate, and potassium edetate, and most optionally is potassium oxalate, lithium oxalate, sodium oxalate, potassium lactate, potassium tartrate, and sodium edetate.

In any of embodiments, the B-type salt is derived from silicate, sulfate, and phosphate, optionally is respective alkali metal salts, alkaline earth metal salts, aluminum salts, or ammonium salts of silicic acid, sulfuric acid, and phosphoric acid, more optionally is lithium silicate, sodium silicate, potassium silicate, sodium sulfate, potassium sulfate, magnesium sulfate, aluminum sulfate, sodium phosphate, sodium dihydrogen phosphate, sodium hydrogen phosphate, potassium phosphate, potassium dihydrogen phosphate, and magnesium phosphate, and most optionally is lithium silicate, sodium silicate, potassium silicate, potassium sulfate, sodium phosphate, and potassium phosphate.

The lithium manganate positive electrode active material of the present disclosure has a cladding structure. The cladding layer clads the lithium manganate matrix, and confers, as a "functional layer," the conventional lithium manganate material with more beneficial effects: during the charging and discharging process, the lithium manganate positive electrode active material of the present disclosure, because of having a cladding layer comprising the organic bonding material, one or more A-type salts, and one or more B-type salts, not only can hinder transition metal manganese ions generated by the lithium manganate matrix from directly "running" into the electrolyte solution, but also can prevent the lithium manganate matrix from generating more transition metal manganese ions caused by being corroded by the electrolyte solution, and further can decrease the transition metal manganese ions that have been generated inside the battery by a chemical reaction or adsorption effect, thereby slowing down the generation of transition metal manganese and catalytic decomposition of a SEI (solid electrolyte interphase) film caused by the transition metal manganese, improving the battery capacity retention rate, and reducing the battery impedance.

In any of embodiments, the mass ratio of the organic bonding material to the lithium manganate matrix is (0.01-5):100, and optionally is (0.3-2):100.

An appropriate amount of the organic bonding material can: guarantee that the A-type salt and the B-type salt are fully adhered to the surface of the lithium manganate matrix, guarantee that the B-type salt fully captures fluoride ions in the electrolyte solution, guarantee that the A-type salt captures the transition metal manganese ions to the utmost extent, and prevent manganese ions from migrating to the negative electrode, thereby reducing the decomposition of the SEI film by the transition metal manganese, improving the capacity retention rate of the battery with lithium manganate as the positive electrode material, and reducing the battery impedance; and then form a cladding layer with an appropriate thickness, which, on the one hand, protects the lithium manganate matrix within the cladding layer from generating metal ions caused by being corroded by the electrolyte solution, and on the other hand, is enough to prevent some transition metal ions generated by the lithium manganate matrix due to force majeure factors from "running" out of the cladding layer and migrating to the negative electrode.

In any of embodiments, the mass ratio of the A-type salt to the lithium manganate matrix is (0.05-10):100, optionally is (0.5-5):100, more optionally is (1.5-3):100.

An appropriate amount of the A-type salt can guarantee full capture of manganese ions without causing very large thickness of the cladding layer and increasing the battery impedance.

In any of embodiments, the mass ratio of the B-type salt to the lithium manganate matrix is (0.05-10):100, optionally is (0.5-5):100, more optionally is (1.5-3):100.

An appropriate amount of the B-type salt can guarantee full capture of the fluoride ions, and avoid corrosion of the lithium manganate matrix without causing very large thickness of the cladding layer and increasing the battery impedance.

In any of embodiments, a ratio of a mass sum of the A-type salt and the B-type salt to mass of the lithium manganate matrix is (0.1-20):100, and optionally is (1-10):100.

A suitable ratio of the mass sum of the B-type salt and the A-type salt to the mass of lithium manganate is beneficial to fully capture of the transition metal ions inside the battery and the fluoride ions in the electrolyte solution, thereby reducing the loss of the SEI film by the formed transition metal manganese, and improving the battery capacity retention rate, and reducing the battery impedance.

In any of embodiments, the mass ratio of the B-type salt to the A-type salt is (0.01-95):1, and optionally is (1-50):1.

In the lithium manganate positive electrode active material of the present disclosure, the B-type salt is used for capturing the fluoride ions in the electrolyte solution, thereby slowing down the precipitation of the transition metal manganese ions caused by the corrosion of the lithium manganate matrix by hydrofluoric acid. The A-type salt is used for directly capturing the transition metal manganese ions inside the battery. The combined use of the B-type salt and the A-type salt has the best effect. When the mass ratio of the B-type salt to the A-type salt is very low, it means that the amount of the B-type salt in the cladding layer is very small, the fluoride ions in the electrolyte solution cannot be fully captured, and the erosion effect on lithium manganate is strengthened; while when the mass ratio of the B-type salt to the A-type salt is very high, it means that mass of the A-type salt in the cladding layer is very small, and the capture rate of the transition metal manganese ions inside the battery by the cladding layer is decreased. If the ratio is too high or too low, the battery capacity retention rate and the battery impedance performance will be affected.

In any of embodiments, a ratio of mass of the organic bonding material to the mass sum of the A-type salt and the B-type salt is (0.01-5):6, optionally is (0.3-1.9):6, more optionally is (0.68-1.09):6.

A suitable proportional relationship between the organic bonding material and the mass sum of the A-type salt and the B-type salt can guarantee the structural integrity of the cladding layer of the lithium manganate positive electrode active material, thereby better implementing the functions of the B-type salt and the A-type salt in the consumption of fluorine ions and capture of manganese ions.

In any of embodiments, the electrode active material has a volume average particle size D50 of 12-20 μm, and optionally is 12-17 μm.

In the lithium manganate positive electrode active material of the present disclosure, when the particle size is too large, the transport path of lithium ions in the positive electrode active material particles increases, the battery impedance increases, which is not advantageous for the processing of the electrode sheet. Through experimental verification, when the particle size thereof is in the range of 12-17 μm, the corresponding battery has better electrical performances.

In any of embodiments, the cladding layer has a thickness of 0.01-5 μm.

A suitable thickness of the cladding layer can sufficiently function to bond, and enough B-type salt and A-type salt are bonded together, and closely bonded to the surface of the lithium manganate matrix. When the cladding layer is very thick, it will hinder the transport of lithium ions in the lithium manganate positive electrode active material, so that lithium ions are not easily released or intercalated, resulting in an increase in the battery impedance.

A second aspect of the present disclosure provides a method for preparing a lithium manganate positive electrode active material, comprising:

preparing a cladding slurry, the cladding slurry comprising an organic bonding material, one or more A-type salts, and one or more B-type salts; and mixing the cladding slurry with lithium manganate, oven drying and pulverizing the mixture to provide the lithium manganate positive electrode active material with lithium manganate as a matrix and with the cladding slurry as a cladding layer.

The method for modifying lithium manganate according to the present disclosure has the advantages of simple process and low cost, and is advantageous for large-scale industrialization.

A third aspect of the present disclosure provides a positive electrode sheet, comprising the lithium manganate positive electrode active material of the first aspect of the present disclosure or the lithium manganate positive electrode active material prepared according to the method of the second aspect of the present disclosure.

In any of embodiments, optionally the positive electrode sheet further comprises a ternary NCM (nickel-cobalt-manganese) material, and the mass ratio of the ternary NCM (nickel-cobalt-manganese) material to the lithium manganate positive electrode active material is 0.01-0.99:1. The positive electrode sheet can be prepared using a method known in the prior art for preparing positive electrode sheets. The ternary NCM (nickel-cobalt-manganese) material can be a ternary NCM (nickel-cobalt-manganese) material known in the prior art for preparing the positive electrode sheet.

A fourth aspect of the present disclosure provides a secondary battery, comprising one or more of the positive electrode active material described in the first aspect of the present disclosure, the lithium manganate positive electrode active material prepared according to the method of the second aspect of the present disclosure, and the positive electrode sheet of the third aspect of the present disclosure. The secondary battery may be prepared using a method known in the prior art for preparing a secondary battery.

A fifth aspect of the present disclosure provides a battery module, comprising the secondary battery in the fourth aspect of the present disclosure. The battery module can be prepared using a method known in the prior art for preparing a battery module.

A sixth aspect of the present disclosure provides a battery pack, comprising one or more of the secondary battery of the fourth aspect of the present disclosure or the battery module of the fifth aspect of the present disclosure. The battery pack can be prepared using a method known in the prior art for preparing a battery pack.

A seventh aspect of the present disclosure provides a powered device comprising one or more of the secondary battery of the fourth aspect of the present disclosure, the battery module of the fifth aspect of the present disclosure, or the battery pack of the sixth aspect of the present disclosure, wherein the secondary battery or the battery module or the battery pack is used as a power source for the powered device or an energy storage unit for the powered device. The powered device can be prepared using a method known in the prior art for preparing a powered device.

The battery module, the battery pack, and the powered device of the present disclosure comprise the secondary battery provided by the present disclosure, and thus having at least the same advantages as that of the secondary battery.

DESCRIPTION OF REFERENCE NUMERALS

1 Battery pack
2 Upper box
3 Lower box
4 Battery module
5 Lithium-ion battery
51 Case
52 Electrode assembly
53 Top cover assembly

DETAILED DESCRIPTION

Hereinafter, the lithium manganate positive electrode active material and its preparation method, as well as the positive electrode sheet, the secondary battery, the battery module, the battery pack and the powered device comprising the same will be described in detail and specifically disclosed with reference to the accompanying drawings, however, there may be cases where unnecessary detailed description is omitted. For example, in order to avoid unnecessary redundancy in the following descriptions and to facilitate the understanding of those skilled in the art, there are cases where detailed descriptions of well-known items and repeated descriptions of actually identical structures are omitted. In addition, the accompanying drawings and subsequent descriptions are provided for those skilled in the art to fully understand the present disclosure, and are not intended to limit the subject matter recited in the claims.

For the sake of brevity, the present disclosure specifically discloses some numerical ranges, and various numerical ranges can be combined with each other to form corresponding embodiments. Any lower limit can be combined with any upper limit to form a range not explicitly recited; and any lower limit can be combined with another lower limit to form a range not explicitly recited, and likewise, any upper limit can be combined with any another upper limit to form a range not explicitly recited. Further, each individually disclosed point or individual numerical value itself may be used as a lower limit or an upper limit for combination with any other point or individual numerical value or with other lower limits or upper limits to form an inexplicitly specified range.

Unless otherwise stated, the terms used herein have the well-known meanings as commonly understood by those skilled in the art. In the present disclosure, unless otherwise stated, "or more" and "or less" encompass the recited number; for example, "one or more of a and b" refers to at least one of a and b, e.g. a, b, or a and b. Likewise, "one or more" is meant to comprise at least one. In the description herein, unless otherwise stated, the term "or" is inclusive, that is, the phrase "A or B" means "A, B, or both A and B".

It should be noted that the term "cladding layer" refers to a portion that clads the lithium manganate matrix, the portion may but not necessarily completely clad the lithium manganate matrix, and the use of "cladding layer" is only for the convenience of description, and is not intended to limit the present disclosure. Likewise, the term "thickness of the cladding layer" refers to the thickness of the portion that clads the lithium manganate matrix along the normal direction of the lithium manganate matrix.

Through many experiments, the inventors have found that for lithium manganate material containing transition metals, during deep charging and discharging, its structure is prone to lattice distortion, and it is easy to be corroded by the electrolyte solution that impregnates its structure (especially by the hydrofluoric acid produced by the decomposition of the electrolyte solution), so that $Mn^{3+}$ and/or $Mn^{4+}$ originally within the structure are dissolved out of the lattice structure of lithium manganate and further disproportionated into $Mn^{2+}$; these produced $Mn^{2+}$ gradually migrate to the surface of the negative electrode under the action of potential difference, and are further reduced to metallic manganese. The resulting metallic manganese is equivalent to a "catalyst", and can catalyze a SEI film on the surface of the negative electrode, so that the organic lithium components and inorganic lithium components in the SEI film are rapidly decomposed, thereby resulting in the SEI film failure, and ultimately decreasing the electrical performance of the battery.

In order to supplement the lost SEI film, the active lithium inside the electrolyte solution and the battery are continuously consumed to convert into organic lithium/inorganic lithium components in a new SEI film, which reduces the content of active lithium actually contributing to charge and discharge, and irreversibly affects the battery capacity retention rate; secondly, the decomposition of SEI film catalyzed by metallic manganese is accompanied by the generation of a series of by-products, which deposit on the surface of the negative electrode, hindering the passage of lithium ions into and out of the negative electrode, thereby increasing the battery impedance. Meanwhile, the continuous consumption of electrolyte in the electrolyte solution also deteriorates the conductivity of the electrolyte solution, increases the resistance to lithium ion migration between the positive electrode and negative electrode, thereby aggravating the deterioration of the battery impedance.

Through extensive experimentation and research, the inventors have found that the negative effects of transition metal manganese on batteries can be reduced from the following two aspects: the first aspect is to reduce the amount of $Mn^{2+}$ produced by the lithium manganate material, such as to prevent the lithium manganate material from directly contacting with the electrolyte solution containing hydrofluoric acid without hindrance, thereby slowing down the decomposition of lithium manganate by hydrofluoric acid; and the second aspect is to prevent $Mn^{2+}$ produced by the lithium manganate material from migrating to the negative electrode. Both of the above approaches can reduce the metallic manganese produced by the decomposition of SEI film. Therefore, from the above two aspects, the inventors have obtained a positive electrode active material capable of significantly improving the battery capacity retention rate and impedance performance by modifying the lithium manganate material.

[Lithium Manganate Positive Electrode Active Material]

Figure 1:
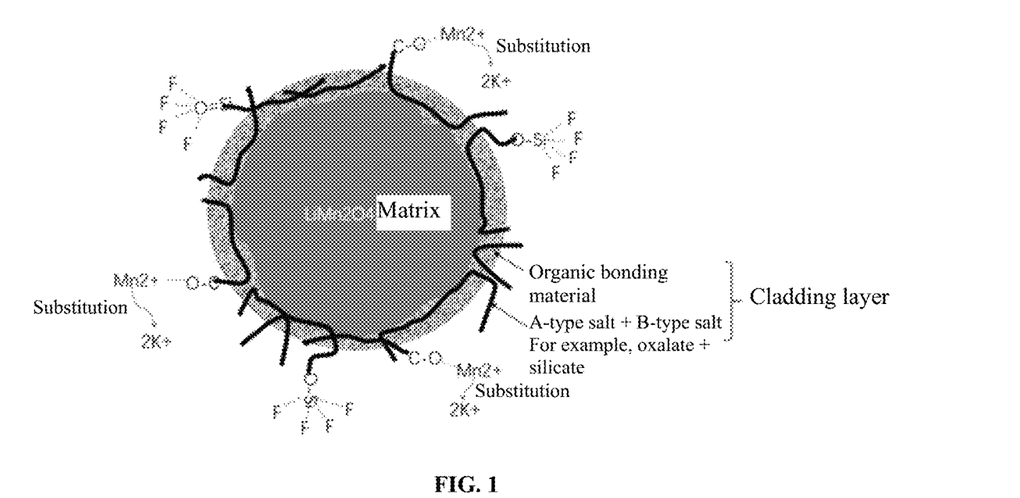
FIG. 1 is a schematic diagram showing the structure and action mode of a lithium manganate positive electrode active material according to an embodiment of the present disclosure (in FIG. 1, an A-type salt oxalate+a B-type salt silicate are used as an example).
Figure 2:
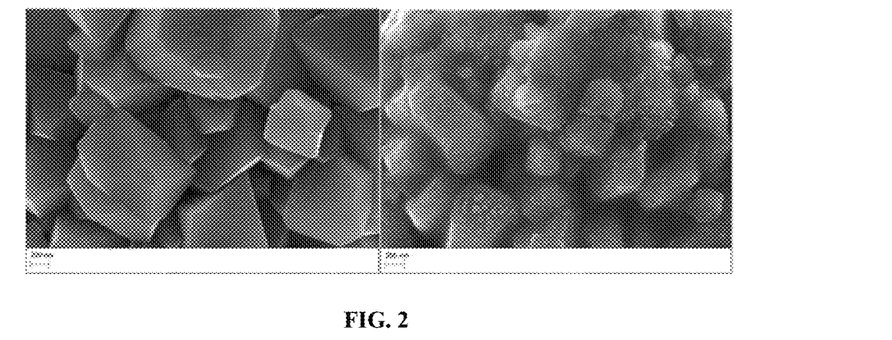
FIG. 2 is an SEM image of the lithium manganate positive electrode active material of Comparative example 1 (left) and Example 1 (right) of the present disclosure.

Referring to FIG. 1 and FIG. 2, the present disclosure provides a lithium manganate positive electrode active material. The positive electrode active material comprises a lithium manganate matrix and a cladding layer. The cladding layer clads the lithium manganate matrix, and comprises an organic bonding material, one or more A-type salts, and one or more B-type salts.

In some embodiments, the organic bonding material is derived from one or more of carboxymethyl cellulose salt, alginate salt, and polyacrylate salt, and optionally is one or more of sodium carboxymethyl cellulose, potassium carboxymethyl cellulose, lithium carboxymethyl cellulose, sodium alginate, potassium alginate, lithium alginate, magnesium alginate, aluminum alginate, sodium polyacrylate, potassium polyacrylate, and magnesium polyacrylate.

In some embodiments, the organic bonding material is derived from one or more of styrene butadiene rubber, polyacrylic acid, polyacrylamide, polyvinyl alcohol, polymethacrylic acid, and carboxymethyl chitosan, and optionally is one or more of polyvinyl alcohol and carboxymethyl chitosan.

In some embodiments, the organic bonding material is derived from one or more of the above organic bonding materials.

In the present disclosure, selection of the A-type salt is not particularly limited, as long as it can be ionized to a radical group that captures manganese ions in an electrolyte solution environment to precipitate manganese ions, and has no adverse impacts on the electrolyte system. Non-limiting examples of A-type salts include oxalate, lactate, tartrate, edetate, aluminate, citrate, pyromellitate, and other polycarboxylates, such as malonate, glutarate, and adipate. In some embodiments, the A-type salt is derived from oxalate, lactate, tartrate, and edetate, is optionally respective alkali metal salts, alkaline earth metal salts, aluminum salts, or ammonium salts of oxalic acid, lactic acid, tartaric acid, and edetic acid, is more optionally potassium oxalate, lithium oxalate, magnesium oxalate, aluminum oxalate, sodium oxalate, sodium lactate, potassium lactate, sodium tartrate, potassium tartrate, sodium edetate, and potassium edetate, and is most optionally potassium oxalate, lithium oxalate, sodium oxalate, potassium lactate, potassium tartrate, and sodium edetate.

The lithium manganate positive electrode active material of the present disclosure has a cladding structure. The cladding layer clads the lithium manganate matrix, and confers, as a "functional layer," the conventional lithium manganate material with more beneficial effects. During the charging and discharging process, the lithium manganate positive electrode active material of the present disclosure, because of having a cladding layer comprising the organic bonding material, one or more A-type salts, and one or more B-type salts, not only can hinder transition metal manganese ions generated by the lithium manganate matrix from directly "running" into the electrolyte solution, but also can prevent the lithium manganate matrix from generating more transition metal manganese ions caused by being corroded by the electrolyte solution, and further can decrease the transition metal manganese ions that have been generated inside the battery by a chemical reaction or adsorption effect. The modified positive electrode active material of the present disclosure has the above beneficial effects, and thus can slow down the generation of transition metal manganese and catalytic decomposition of the SEI film caused by the transition metal manganese during storage and use of the battery, thereby improving the battery capacity retention rate, and reducing the battery impedance.

The lithium manganate positive electrode active material of the present disclosure comprises a cladding layer composed of an organic bonding material, and one or more A-type salts and one or more B-type salts bound by the organic bonding material. One of the functions of the cladding layer is to serve as a "barrier layer." During charging and discharging of the lithium-ion battery several times, the lithium manganate-based positive electrode active material will inevitably generate transition metal manganese ions, and the existence of the "barrier layer" can effectively prevent the transition metal manganese ions generated by the lithium manganate matrix from directly "running" into the electrolyte solution.

In addition, the "barrier layer" can further prevent the lithium manganate matrix from generating more transition metal manganese ions due to barrier-free direct contact with the electrolyte solution. After several times of charge-discharge cycles, the electrolyte in the electrolyte solution will be decomposed, thus producing water and strongly corrosive hydrofluoric acid. If lithium manganate is in direct contact with the corrosive electrolyte solution, direct corrosion of lithium manganate by hydrofluoric acid will be caused, such that lithium manganate is decomposed to produce more transition metal manganese ions. In the present disclosure, however, the inventor arranges a cladding layer outside lithium manganate, which is equivalent to arranging a protective layer for the lithium manganate matrix, to prevent the lithium manganate material from barrier-free direct contact with the electrolyte solution containing hydrofluoric acid, and significantly slowing down the decomposition of lithium manganate by hydrofluoric acid, thereby reducing the amount of $Mn^{2+}$ present in the battery system.

In addition, the cladding layer of the present disclosure comprises a B-type salt component. The B-type salt can capture fluoride ions produced by the electrolyte solution, thereby reducing the amount of hydrofluoric acid, slowing down the corrosive decomposition of lithium manganate by the hydrofluoric acid, and reducing the amount of $Mn^{2+}$ present in the battery system. Non-limiting examples of B-type salts include silicate, sulfate, phosphate, phosphite, sulfonate, and the like. In some embodiments, the B-type salt is selected from the group consisting of silicate, sulfate, and phosphate, optionally is respective alkali metal salts, alkaline earth metal salts, aluminum salts, or ammonium salts of silicic acid, sulfuric acid, and phosphoric acid, more optionally is lithium silicate, sodium silicate, potassium silicate, sodium sulfate, potassium sulfate, magnesium sulfate, aluminum sulfate, sodium phosphate, sodium dihydrogen phosphate, sodium hydrogen phosphate, potassium phosphate, potassium dihydrogen phosphate, and magnesium phosphate, most optionally is lithium silicate, sodium silicate, potassium silicate, potassium sulfate, sodium phosphate, and potassium phosphate.

Extensive experimentation and research by the inventors show that the mechanism of action of B-type salts consuming hydrofluoric acid to avoid the generation of manganese ions is that acid radicals of the B-type salts directly adsorb fluoride ions in the electrolyte solution or react with hydrofluoric acid to consume fluoride ions. As an example, for example, there are two mechanisms of action by which the silicate consumes the hydrofluoric acid as follows: firstly, the potassium silicate decomposes with the electrolyte solution to produce silicic acid, which reacts with hydrofluoric acid as follows: $H_2SiO_3+4HF\rightarrow SiF_4+3H_2O$; and secondly, the $(-O-Si)_2=O$ group in the silicate is capable of adsorbing fluoride ions in the electrolyte solution. Therefore, the silicate in the cladding layer can reduce the content of hydrofluoric acid contained in the electrolyte solution, and avoid the generation of transition metal manganese ions due to the corrosion of the lithium manganate matrix by the hydrofluoric acid.

The cladding layer in accordance with the present disclosure further comprises an A-type salt. Inside the battery comprising the transition metal $Mn^{2+}$, the A-type salt dissolved in the electrolyte solution is ionized to generate acid radical ions, thereby capturing possibly generated manganese ions. As an example, for example, an oxalate ionizes to generate $C_2O_4^{2-}$ group, and in comparison to alkali metal ions such as $Na^+$, $K^+$ etc., the $C_2O_4^{2-}$ groups generated by ionization preferentially bond with $Mn^{2+}$, thereby reducing or even eliminating $Mn^{2+}$ that mitigates to the negative electrode terminal.

The cladding layer further comprises an organic bonding material. An electrolyte solution of a lithium-ion battery is generally formed by dissolving various electrolytes that are beneficial to the performance of the battery in an organic solvent. Therefore, in an organic system, the A-type salt and the B-type salt are generally insoluble or hardly soluble in the electrolyte solution, and therefore when the A-type salt and the B-type salt are directly added to an electrolyte solution or directly added to a positive electrode slurry dissolved by an organic solvent, there are problems of uneven mixing, incomplete and uneven contact with transition metal ions and fluoride ions, which significantly reduces the beneficial effects. Therefore, it is difficult to effectively add the A-type salt and the B-type salt into battery systems in practical industrial production processes. For this purpose, on the one hand, the organic bonding material in the present disclosure functions to bond, i.e., bonding the A-type salt and the B-type salt to the surface of the lithium manganate matrix; and on the other hand, some organic bonding materials, such as carboxymethyl cellulose salt, alginate salt, polyacrylate salt and the like also contain functional groups for bonding $Mn^{2+}$, and thus also function to reduce $Mn^{2+}$ in the battery system.

Thus, the cladding layer of the present disclosure, with combined action of the organic bonding material, one or more A-type salts, and one or more B-type salts, significantly reduces the content of transition metal $Mn^{2+}$ inside the battery, and then significantly reduces the amount of metal manganese generated by "catalytic" decomposition of the SEI film, thereby slowing down the decomposition and consumption of the SEI film by the transition metal manganese, then reducing the consumption of active lithium in the battery system, increasing the content of active lithium that does contribute to charge and discharge, and finally Improving the battery capacity retention rate after repeated charge-discharge cycles of the battery. Then, under the action of the above modified lithium manganate material, the decomposition of the SEI film by the transition metal is significantly slowed down, so that the by-products generated by the decomposition of the SEI film are also significantly reduced, thus avoiding the deposition of a large number of by-products on the surface of the negative electrode, reducing the resistance of lithium ions entering into and leaving from the negative electrode, and reducing the battery impedance. Further, under the action of the above modified lithium manganate material, the decomposition rate of the SEI film is significantly reduced, so that the consumption of the electrolyte in the electrolyte solution is also significantly reduced, thereby achieving better maintenance effects of the conductivity of the electrolyte solution. Therefore, compared to a lithium-ion battery with unmodified lithium manganate material as the positive electrode active material, the present disclosure significantly reduces the migration resistance of lithium ions between the positive electrode and negative electrode, and the internal resistance increase rate of the battery in the present disclosure is lower after several times of charge and discharge.

In some embodiments, the mass ratio of the organic bonding material to the lithium manganate matrix is (0.01-5):100, and optionally is (0.3-2):100.

As described above, the organic bonding material is crucial to the establishment of beneficial functions of the lithium manganate of the present disclosure. In addition, through extensive experimentation, the inventors have found that:

When the content of the organic bonding material in the cladding layer is too low, sufficient bonding effect cannot be achieved; on the one hand, sufficient amount of the A-type salt and the B-type salt cannot be bonded, and on the other hand, it cannot be tightly bonded with the surface of the lithium manganate matrix, which results in the reduction of the above beneficial effects of the organic bonding material and even the failure of the function of the cladding layer. In contrast, when the content of the organic bonding material in the cladding layer is too high, the cladding layer may be too thick, which hinders the transport of lithium ions in the lithium manganate positive electrode active material, so that lithium ions are not easily released or intercalated, resulting in an increase in the battery impedance. However, an appropriate amount of the organic bonding material can: guarantee that the A-type salt and the B-type salt are fully adhered to the surface of the lithium manganate matrix, guarantee that the B-type salt fully captures fluoride ions in the electrolyte solution, guarantee that the A-type salt captures the transition metal manganese ions to the utmost extent, and prevent manganese ions from migrating to the negative electrode, thereby reducing the decomposition of the SEI film by the transition metal manganese, improving the capacity retention rate of the battery with lithium manganate as the positive electrode material, and reducing the battery impedance; and then form a cladding layer with an appropriate thickness, which, on the one hand, prevents the lithium manganate matrix within the cladding layer from generating metal ions caused by being corroded by the electrolyte solution, and on the other hand, is enough to prevent some transition metal ions generated by the lithium manganate matrix due to force majeure factors from "running" out of the cladding layer.

In some embodiments, the cladding layer can completely clad the lithium manganate matrix, or can partially clad the lithium manganate matrix, specifically depending on the amount of each substance in the cladding layer. The inventor found through experimentation and research that whether the cladding layer completely clads the lithium manganate matrix depends largely on the amount of the organic bonding material. When the mass ratio of the organic bonding material to the lithium manganate matrix is higher than 1:100, the cladding layer can substantially completely clad the lithium manganate matrix. When the organic bonding material content is too high, i.e., when the cladding is excessive, the impedance of the lithium-ion secondary battery may be deteriorated.

In some embodiments, the mass ratio of the organic bonding material to the lithium manganate matrix may be 0.01:100, 0.3:100, 0.68:100, 1.09:100, 1.9:100, 5:100, or a value within a range obtained by combining any two of the above values.

In any of embodiments, the mass ratio of the A-type salt to the lithium manganate matrix is (0.05-10):100, optionally is (0.5-5):100, more optionally is (1.5-3):100.

An appropriate amount of the A-type salt can guarantee full capture of manganese ions without causing very large thickness of the cladding layer and increasing the battery impedance.

In any of embodiments, the mass ratio of the B-type salt to the lithium manganate matrix is (0.05-10):100, optionally is (0.5-5):100, more optionally is (1.5-3):100.

An appropriate amount of the B-type salt can guarantee full capture of the fluoride ions, and avoid corrosion of the lithium manganate matrix without causing very large thickness of the cladding layer and increasing the battery impedance.

In some embodiments, a ratio of a mass sum of the B-type salt and the A-type salt to mass of the lithium manganate matrix is (0.1-20):100, and optionally is (1-10):100.

A suitable ratio of the mass sum of the B-type salt and the A-type salt to the mass of lithium manganate is beneficial to fully capture the transition metal ions inside the battery and the fluoride ions in the electrolyte solution, thereby reducing the consumption of the SEI film by the transition metal manganese, improving the battery capacity retention rate, and reducing the battery impedance.

When the content of the B-type salt and the A-type salt in the cladding layer is too low, it results in that the outer layer cannot provide sufficient groups for capturing fluoride ions and transition metal ions, and the improvement of the electrical performance of the battery is not much. In contrast, when the content of the B-type salt and the A-type salt in the cladding layer is too high, since the B-type salt and the A-type salt in the cladding layer contains no active lithium ions, the gram capacity of the lithium manganate positive electrode active material is decreased, that is, the mass proportion of effective lithium manganate in the lithium manganate positive electrode active material with the same mass is decreased, thus the theoretical gram capacity thereof is lost.

In some embodiments, the ratio of the mass sum of the B-type salt and the A-type salt to the mass of the lithium manganate matrix may be 0.1:100, 0.5:100, 1:100, 3:100, 6:100, 8:100, 10:100, 15:100, 20:100, or a value within a range obtained by combining any two of the above values.

In some embodiments, optionally the mass ratio of the B-type salt to the A-type salt is (0.01-95):1, and optionally is (1-50):1.

In the lithium manganate positive electrode active material of the present disclosure, the B-type salt is used for capturing fluoride ions in the electrolyte solution, thereby slowing down the precipitation of transition metal manganese ions caused by the corrosion of the lithium manganate matrix by hydrofluoric acid; and the A-type salt is used for directly capturing the transition metal manganese ions inside the battery. The combined use of the B-type salt and the A-type salt has the best effect. When the mass ratio of the B-type salt to the A-type salt is too low, it means that the amount of the B-type salt in the cladding layer is too small, the fluoride ions in the electrolyte solution cannot be fully captured, and the erosion effect on lithium manganate is strengthened; and in contrast, when the mass ratio of the B-type salt to the A-type salt is too high, it means that mass of the A-type salt in the cladding layer is too small, and the capture rate of the transition metal manganese ions inside the battery by the cladding layer is decreased. Therefore, if the ratio is too high or too low, more transition metal manganese ions migrate to the negative electrode and are reduced to metallic manganese, thereby affecting the battery capacity retention rate and the battery impedance performance.

In some embodiments, the mass ratio of the B-type salt to the A-type salt may be 0.01:1, 0.1:1, 1:1, 10:1, 50:1, 90:1, 95:1, or a value within a range obtained by combining any two of the above values.

In any of embodiments, a ratio of mass of the organic bonding material to the mass sum of the A-type salt and the B-type salt is (0.01-5):6, optionally is (0.3-19):6, more optionally is (0.68-1.09):6.

An appropriate ratio of the mass of the organic bonding material to the mass sum of the A-type salt and the B-type salt can guarantee the structural integrity of the lithium manganate positive electrode active material, thereby the functions of the A-type salt and the B-type salt in the consumption of fluorine ions and capture of manganese ions can be better implemented.

In some embodiments, optionally the lithium manganate positive electrode active material has a volume average particle size D50 of 12-20 μm, optionally is 12-17 μm.

In the lithium manganate positive electrode active material of the present disclosure, when the particle size is too large, the transport path of lithium ions in the positive electrode active material particles increases, the battery impedance increases, which is not advantageous for the processing of the electrode sheet. Through experimental verification, when the particle size thereof is in the range of 12-17 μm, the corresponding battery has better electrical performances.

Optionally, the volume average particle size D50 of the positive electrode active material may be 12 μm, 13 μm, 14 μm, 17 μm, 20 μm, or a value within a range obtained by combining any two of the above values.

Based on independent particles, the lithium manganate matrix itself can be of a primary particle or a secondary particle (i.e., agglomerated primary particles), and its volume average particle size is 12 μm.

In some embodiments, optionally the cladding layer has a thickness of 0.01-5 μm.

When the thickness of the cladding layer is too low, it means that the binder content in the cladding layer is very low, sufficient bonding effect cannot be achieved; on the one hand, sufficient amount of the B-type salt and the A-type salt cannot be bonded, and on the other hand, it cannot be tightly bonded with the surface of the lithium manganate matrix, thus making the cladding layer ineffective. In contrast, when the cladding layer is very thick, it will hinder the transport of lithium ions in the lithium manganate positive electrode active material, so that lithium ions are not easily released or intercalated, resulting in an increase in the battery impedance.

The lithium manganate positive electrode active material of the present disclosure has better mechanical properties, and after being prepared into a positive electrode sheet or a lithium-ion secondary battery, the structure of the lithium manganate positive electrode active material is well maintained, the thickness of the cladding layer has no obvious change.

In an embodiment of the present disclosure, there is provided a method for preparing a lithium manganate positive electrode active material, comprising:

Step 1: preparing a cladding slurry, the cladding slurry comprising an organic bonding material, one or more A-type salts, and one or more B-type salts; and Step 2: mixing the cladding slurry with lithium manganate, oven drying and pulverizing the mixture to provide the lithium manganate positive electrode active material with lithium manganate as a matrix and with the cladding slurry as a cladding layer.

Specifically:

In step 1, based on 100 parts by mass of lithium manganate, the organic bonding material and deionized water are stirred and mixed at a mass ratio of (0.01-5):(30-80) to provide a colloidal solution; and a mixture of the B-type salt and the A-type salt is added to the colloidal solution, and the resulting mixture is sufficiently stirred to provide the cladding slurry. A mass ratio of the mixture of the added B-type salt and A-type salt to lithium manganate is (0.1-20):100, and a mass ratio of the B-type salt to the A-type salt is (0.01-95):1.

In step 2, 100 parts by mass of lithium manganate are added to the cladding slurry in step 1, and the mixture is sufficiently stirred and mixed. The sufficiently mixed mixture is oven dried and ground to provide modified lithium manganate positive electrode active material of the present disclosure.

In some embodiments, in step 1 and step 2, the stirring temperature is 20-40° C., the rotational speed of stirring is 100-1500 rpm, and the stirring time is 30-60 min.

In some embodiments, in step 2, the oven drying is optionally oven drying while stirring, the oven drying temperature is from 50 to 100° C., and the oven drying time is from 8 to 12 h.

In some embodiments, in step 2, the grinding method is optionally ball milling. Compared with other grinding methods, ball-milled particles are more uniform.

[Positive Electrode Sheet]

Figure 3:
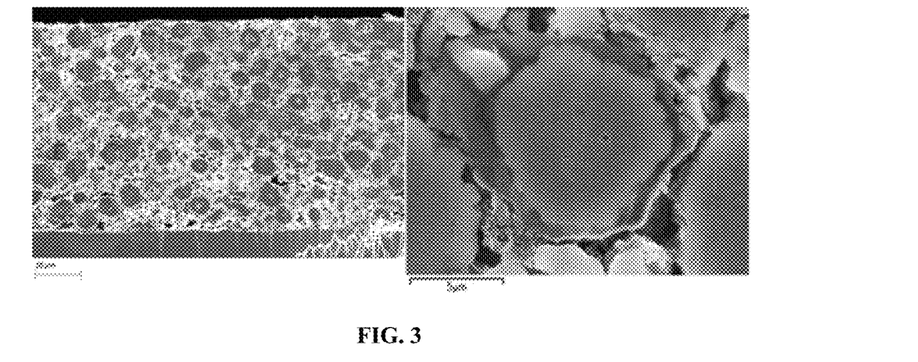
FIG. 3 is an SEM image of an electrode sheet prepared in Example 1 of the present disclosure under different magnifications.

Referring to FIG. 3, the present disclosure provides a positive electrode sheet comprising the lithium manganate positive electrode active material in the first aspect of the present disclosure.

In some embodiments, optionally the positive electrode sheet further comprises an ternary NCM (nickel-cobalt-manganese) material, and the mass ratio of the ternary NCM (nickel-cobalt-manganese) material to the lithium manganate positive electrode active material is 0.01-0.99:1.

Currently, when pure lithium manganate is used as positive electrode active material for lithium-ion batteries, the corresponding lithium-ion battery has poor electrical properties, especially poor energy density, and thus a ternary NCM (nickel-cobalt-manganese) material is generally used in combination. The combined use of lithium manganate and ternary NCM material has the following beneficial effects: reducing the cost of using ternary NCM (nickel-cobalt-manganese) material alone; improving battery stability and safety; solving the problem that it is difficult to manage and control the BMS (Battery Management System) platform due to the voltage platform mismatch between lithium manganate and ternary NCM material; in addition, the surface of the ternary NCM (nickel-cobalt-manganese)

material contains alkaline residual lithium, which can neutralize part of the hydrofluoric acid in the electrolyte solution.

The positive electrode sheet includes a positive electrode current collector and a positive electrode material provided on at least one surface of the positive electrode current collector. By way of example, the positive electrode current collector has two opposite surfaces in the direction of its own thickness, and the positive electrode material is provided on either or both of the two opposite surfaces of the positive electrode current collector.

In the lithium-ion secondary battery of the present disclosure, the positive electrode current collector can be a metal foil or a composite current collector. For example, as the metal foil, an aluminum foil can be used. The composite current collector may include a high molecular material substrate layer and a metal layer formed on at least one surface of the high molecular material substrate layer. The composite current collector can be formed by forming the metal material (aluminum, aluminum alloy, nickel, nickel alloy, titanium, titanium alloy, silver and silver alloy, etc.) on the high molecular material substrate (such substrate as polypropylene (PP), polyethylene terephthalate (PET), polybutylene terephthalate (PBT), 1,3-propane sultone (PS), polyethylene (PE), etc.), although the present disclosure is not limited to these materials.

The positive electrode material further, in some embodiments, comprises a conductive agent. However, the type of the conductive agent is not particularly limited, and those skilled in the art can make a selection according to the actual needs. By way of example, the conductive agent for the positive electrode material can be selected from one or more of superconducting carbon, acetylene black, carbon black, Ketjen black, carbon dot, carbon nanotube, graphene, and carbon nanofiber.

The positive electrode sheet in the present disclosure can be prepared according to the methods known in the art. By way of example, the positive electrode active material, the conductive agent and the binder of the present disclosure can be dispersed in a solvent (for example, N-methyl pyrrolidone (NMP)) to form a uniform positive electrode slurry; the positive electrode slurry is coated on the positive electrode current collector, and after oven drying, cold pressing and other procedures, the positive electrode sheet is obtained.

[Negative Electrode Sheet]

The negative electrode sheet includes a negative electrode current collector and a negative electrode film layer arranged on at least one surface of the negative electrode current collector, the negative electrode film layer including a negative electrode active material.

By way of example, the negative electrode current collector has two opposite surfaces in the direction of its own thickness, and the negative electrode film layer is provided on either or both of the two opposite surfaces of the negative electrode current collector.

In the lithium-ion secondary battery of the present disclosure, the negative electrode current collector can be a metal foil or a composite current collector. For example, as the metal foil, a copper foil can be used. The composite current collector may include a high molecular material substrate layer and a metal layer formed on at least one surface of the high molecular material substrate layer. The composite current collector can be formed by forming the metal material (copper, copper alloy, nickel, nickel alloy, titanium, titanium alloy, silver and silver alloy, etc.) on the high molecular material substrate (such substrate as polypropylene (PP), polyethylene terephthalate (PET), polybutylene terephthalate (PBT), polystyrene (PS), polyethylene (PE), etc.), although the present disclosure is not limited to these materials.

In the negative electrode sheet of the present disclosure, the negative electrode film layer generally comprises a negative electrode active material and an optional binder, an optional conductive agent and other optional auxiliaries, and is usually formed by coating a negative electrode slurry and drying. The negative electrode slurry is generally formed by dispersing the negative electrode active material as well as the optional conductive agent and the binder, etc. in a solvent and uniformly stirring. The solvent may be N-methyl pyrrolidone (NMP) or deionized water.

By way of example, the conductive agent can be selected from one or more of superconducting carbon, acetylene black, carbon black, Ketjen black, carbon dot, carbon nanotube, graphene, and carbon nanofiber.

In the negative electrode sheet of the present disclosure, in addition to the negative electrode active material, the negative electrode film layer optionally may also comprise other common negative electrode active materials, for example, as the other common negative electrode active materials, artificial graphite, natural graphite, soft carbon, hard carbon, silicon matrix material, tin matrix material, lithium titanate and the like can be cited. The silicon matrix material can be selected from one or more of elemental silicon, silicon-oxygen compound, silicon-carbon composite, silicon-nitrogen composite, and silicon alloy. The tin matrix material can be selected from one or more of elemental tin, tin-oxygen compound, and tin alloy.

[Electrolyte]

The electrolyte serves to conduct ions between the positive electrode sheet and the negative electrode sheet. The type of the electrolyte is not particularly limited in the present disclosure, and can be selected according to needs. For example, the electrolyte may be selected from at least one of solid electrolytes and liquid electrolytes (i.e., electrolyte solutions).

In some embodiments, the electrolyte is an electrolyte solution. The electrolyte solution comprises an electrolyte salt and a solvent.

In some embodiments, the electrolyte salt can be selected from one or more of lithium hexafluorophosphate (LiPF$_6$), lithium tetrafluoroborate (LiBF$_4$), lithium perchlorate (LiClO$_4$), lithium hexafluoroarsenate (LiAsF$_6$), lithium bis (fluorosulfonyl)imide (LiFSI), lithium bis(trifluoromethanesulfonyl)imide (LiTFSI), lithium trifluoromethanesulfonate (LiTFS), lithium difluoro(oxalato)borate (LiDFOB), lithium bis(oxalate)borate (LiBOB), lithium difluorophosphate (LiPO$_2$F$_2$), lithium difluoro bis(oxalato)phosphate (LiDFOP), and lithium tetrafluoro(oxalato)phosphate (LiTFOP).

In some embodiments, the solvent can be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS) and diethyl sulfone (ESE).

In some embodiments, the electrolyte solution further optionally comprises an additive. For example, the additive may include a negative electrode film-forming additive, or may include a positive electrode film-forming additive, or may further include an additive that can improve some performance of the battery, such as an additive that improves overcharge performance of the battery, an additive that improves high temperature performance of the battery, and an additive that improves low temperature performance of the battery.

[Separator]

lithium-ion secondary batteries employing electrolyte solutions as well as some lithium-ion secondary batteries employing solid electrolytes also include separators. A separator is provided between the positive electrode sheet and the negative electrode sheet, and functions to separate. The type of the separator is not particularly limited in the present disclosure, and any well-known separator with a porous structure having good chemical stability and mechanical stability may be selected. In some embodiments, the material of the separator may be one or more selected from the group consisting of glass fiber, non-woven cloth, polyethylene, polypropylene, and polyvinylidene fluoride. The separator may be a single-layer film or a multi-layer composite film, which is not particularly limited. When the separator is a multi-layer composite film, the materials in various layers may be identical or different, which is not particularly limited.

[Lithium-Ion Secondary Battery]

In some embodiments, the positive electrode sheet, the negative electrode sheet, and the separator can be made into an electrode assembly by a winding process or a lamination process.

In some embodiments, the secondary battery of the present disclosure is a lithium-ion secondary battery.

In some embodiments, the lithium-ion secondary battery can include an outer package. The outer package can be used to encapsulate the above-mentioned electrode assembly and electrolyte.

In some embodiments, the outer package of the lithium-ion secondary battery can be a hard case, such as a hard plastic case, an aluminum case, a steel case, and the like. The outer package of the lithium-ion secondary battery can also be a soft pack, such as a bag-type soft pack. The material of the soft pack can be a plastic, and examples as plastics include polypropylene (PP), polybutylene terephthalate (PBT) and polybutylene succinate (PBS).

Figure 6:
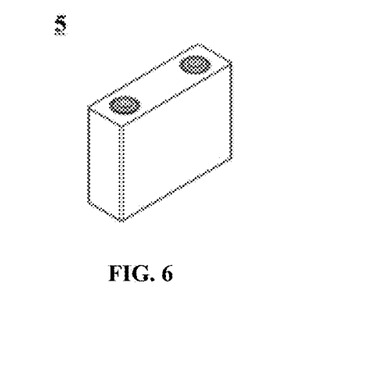
FIG. 6 is a schematic view of a lithium-ion battery according to an embodiment of the present disclosure.

The shape of the lithium-ion secondary battery is not particularly limited in the present disclosure, and may be cylindrical, square or of any other shapes. For example, FIG. 6 is an example of lithium-ion battery 5 having a square structure.

Figure 7:
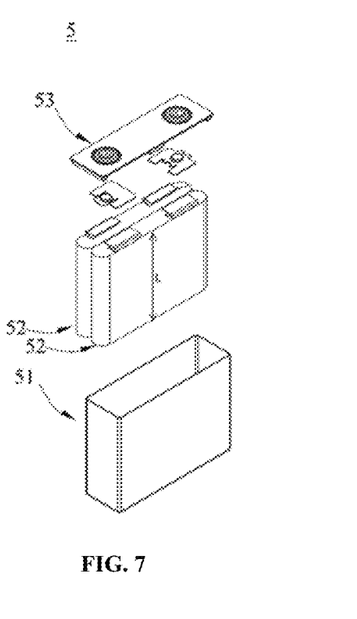
FIG. 7 is an exploded view of a lithium-ion battery according to an embodiment of the present disclosure shown in FIG. 6.

In some embodiments, referring to FIG. 7, the outer package can include a case 51 and a cover plate 53. Here, the case 51 can include a bottom plate and a side plate connected to the bottom plate, with the bottom plate and the side plate enclosing to form an accommodating cavity. The case 51 has an opening that communicates with the accommodating cavity, and the cover plate 53 can cover the opening to close the accommodating cavity. The positive electrode sheet, the negative electrode sheet, and the separator may form an electrode assembly 52 by a winding process or a lamination process. The electrode assembly 52 is encapsulated within the accommodating cavity. The electrolyte solution impregnates the electrode assembly 52. The number of electrode assemblies 52 contained in the lithium-ion battery 5 can be one or more, and can be selected by those skilled in the art according to specific needs.

[Battery Module]

In some embodiments, the lithium-ion secondary batteries may be assembled into a battery module, the number of lithium-ion batteries comprised in the battery module may be one or more, and the specific number may be selected by those skilled in the art based on the application and capacity of the battery module.

Figure 8:
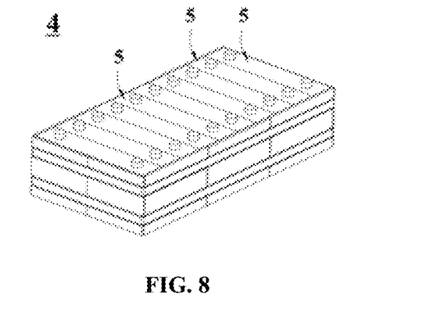
FIG. 8 is a schematic view of a battery module according to an embodiment of the present disclosure.

FIG. 8 is an example of battery module 4. Referring to FIG. 8, in the battery module 4, a plurality of lithium-ion batteries 5 can be sequentially arranged along the length direction of the battery module 4. Of course, any other arrangement is also possible. The plurality of lithium-ion batteries 5 may further be fixed by fasteners.

Optionally, the battery module 4 can also include a housing having an accommodating space, in which the plurality of lithium-ion batteries 5 are accommodated.

[Battery Pack]

In some embodiments, the above-mentioned battery modules can also be assembled into a battery pack, and the number of battery modules contained in the battery pack can be selected by those skilled in the art according to the application and capacity of the battery pack.

Figure 9:
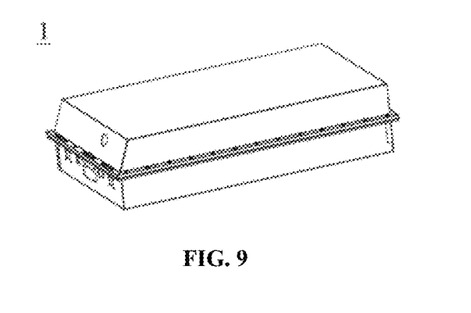
FIG. 9 is a schematic view of a battery pack according to an embodiment of the present disclosure.
Figure 10:
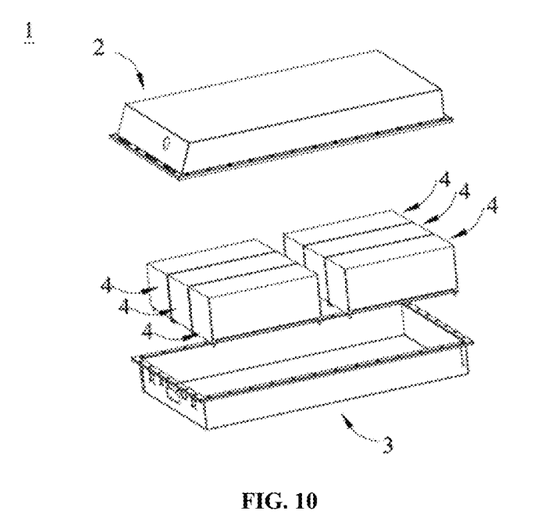
FIG. 10 is an exploded view of a battery pack according to an embodiment of the present disclosure shown in FIG. 9.

FIGS. 9 and 10 are an example of battery pack 1. Referring to FIG. 9 and FIG. 10, the battery pack 1 may comprise a battery box and a plurality of battery modules 4 arranged in the battery box. The battery box comprises an upper box 2 and a lower box 3. The upper box 2 can cover the lower box 3 and form an enclosed space for accommodating the battery module 4. The plurality of battery modules 4 may be distributed in the battery box according to any manner.

[Powered Device]

In addition, the present disclosure further provides a powered device, and the powered device includes one or more of the lithium-ion battery, the battery module, or the battery pack provided by the present disclosure. The lithium-ion battery, the battery module or the battery pack may be used as a power source for the device or an energy storage unit for the device. The device may be but is not limited to a mobile device (such as a mobile phone, a laptop, etc.), an electric vehicle (such as an all-electric vehicle, a hybrid electric vehicle, a plug-in hybrid electric vehicle, an electric bicycle, an electric scooter, an electric golf cart, an electric truck, etc.), an electric train, a ship, a satellite, an energy storage system, etc.

The lithium-ion battery, the battery module, or the battery pack can be selected as the powered device according to use requirements.

Figure 11:
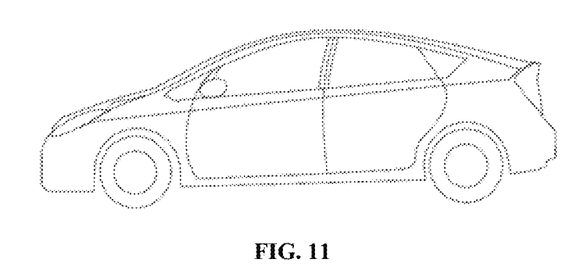
FIG. 11 is a schematic view of a powered device according to an embodiment of the present disclosure.

FIG. 11 is an example of the device. The device is an all-electric vehicle, a hybrid electric vehicle, or a plug-in hybrid electric vehicle, etc. In order to meet the requirements of the device for high power and high energy density of lithium-ion batteries, the battery pack or the battery module may be adopted.

A device as another instance may be a mobile phone, a tablet computer, a laptop, etc. The device is typically required to be thin, and the lithium-ion battery may be adopted as a power source.

EXAMPLES

Examples of the present disclosure are illustrated below. The examples described below are illustrative, are merely used to explain the present disclosure, and should not be construed as a limitation to the present disclosure. Where specific techniques or conditions are not specified in the examples, the techniques or conditions described in the literatures of the art or the product specifications are followed. Where manufacturers are not specified, the reagents or instruments used are conventional products commonly used in the art and are commercially available. if not specified, the content of each ingredient in the examples of the present disclosure is based on the dry weight without water of crystallization.

The raw material sources involved in the examples of the present application are as follows:

Lithium manganate ($LiMn_2O_4$, Tianjin Guoan Mengguli New Materials Science & Technology Co., Ltd.)

Nickel-cobalt-manganese ($LiMO_2$, M is Ni—Co—Mn solid solution, and the mass ratio thereof is 55:12:33)

Sodium carboxymethyl cellulose (CMC, CAS: 900-432-4, Shanghai Macklin Biochemical Co., Ltd.)

Sodium alginate (SA, CAS: 9005-38-3, Shanghai Macklin Biochemical Co., Ltd.)

Sodium polyacrylate (PAAS, CAS: 9003-04-7, Shanghai Macklin Biochemical Co., Ltd.)

Carboxymethyl chitosan (CMCS, CAS: 83512-85-0, number average molecular weight: about 9,000, Shanghai Macklin Biochemical Co., Ltd.)

Potassium silicate ($K_2SiO_3$, CAS: 1312-76-1, Shanghai Macklin Biochemical Co., Ltd.)

Potassium phosphate ($K_3PO_4$, CAS: 7778-53-2, Shanghai Macklin Biochemical Co., Ltd.)

Potassium sulfate ($K_2SO_4$, CAS: 7778-80-5, Shanghai Macklin Biochemical Co., Ltd.)

Potassium oxalate ($K_2C_2O_4$, CAS: 6487-48-5, Shanghai Macklin Biochemical Co., Ltd.)

Potassium lactate ($C_3H_5KO_3$, CAS: 996-31-6, Shanghai Macklin Biochemical Co., Ltd.)

Potassium tartrate ($C_4H_4O_6K_2$, CAS: 6100-19-2, Shanghai Macklin Biochemical Co., Ltd.)

Potassium edetate ($C_{10}H_{14}K_2N_2O_8$, CAS: 25102-12-9, Shanghai Macklin Biochemical Co., Ltd.)

Conductive agent carbon black (CAS: 1333-86-4, Shanghai Macklin Biochemical Co., Ltd.)

Polyvinylidene fluoride (PVDF, CAS: 24937-79-9, Shanghai Macklin Biochemical Co., Ltd.)

N-methyl pyrrolidone (NMP, CAS: 872-50-4, Shanghai Macklin Biochemical Co., Ltd.)

Styrene butadiene rubber (SBR, CAS: 9003-55-8, Shanghai Macklin Biochemical Co., Ltd.)

Ethylene carbonate (EC, CAS: 96-49-1, Shanghai Macklin Biochemical Co., Ltd.)

Dimethyl carbonate (DMC, CAS: 616-38-6, Shanghai Macklin Biochemical Co., Ltd.)

Example 1

[Preparation of Lithium Manganate Positive Electrode Active Material]

Based on 100 g of lithium manganate (by $LiMn_2O_4$, the same below) with a volume average particle size D50 of 12 μm, 0.68 g of sodium carboxymethyl cellulose was dissolved in 68 g of deionized water, and the mixture was stirred at a rotational speed of 800 rpm at 25° C. for 30 min to provide a uniform colloidal solution; 1.5 g of potassium silicate (by $k_2SiO_3$) and 1.5 g of potassium oxalate (by $k_2C_2O_4$) were weighed, and added into the above colloidal solution, and the mixture was stirred at a rotational speed of 800 rpm at 25° C. for 30 min, to provide a uniform cladding slurry; 100 g of lithium manganate was weighed, and added into the above cladding slurry, and the mixture was stirred at a rotational speed of 800 rpm at 25° C. for 5 h, to provide a uniform mixed system; the above mixed system was stirred at 800 rpm at 80° C. for an additional 12 h for evaporation to dryness, to provide a solid mixture; and the above solid mixture was ground to provide lithium manganate positive electrode active material in Example 1 of the present disclosure.

[Preparation of Positive Electrode Sheet]

The lithium manganate positive electrode active material in Example 1, a ternary nickel-cobalt-manganese (NCM) material, a conductive agent carbon black, a binder polyvinylidene fluoride (PVDF), and N-methyl pyrrolidone (NMP) were stirred and sufficiently mixed at a weight ratio of 67.34:30:28.86:2.7:1.1 to provide a positive electrode slurry. Then, the positive electrode slurry was uniformly coated on a positive electrode current collector, and then oven dried, cold pressed, and slit to provide the positive electrode sheet.

[Preparation of Negative Electrode Sheet]

An active material artificial graphite, a conductive agent carbon black, a binder styrene butadiene rubber (SBR), and a thickener sodium carboxymethyl cellulose (CMC) were dissolved in a solvent deionized water at a weight ratio of 96.2:0.8:0.8:1.2. The solution was sufficiently mixed to prepare a negative electrode slurry. The negative electrode slurry was uniformly coated on a copper foil of the negative electrode current collector once or more than once, oven dried, cold pressed, and slit to provide the negative electrode sheet.

[Preparation of Electrolyte Solution]

In a glove box in an argon atmosphere ($H_2O$<0.1 ppm, $O_2$<0.1 ppm), an organic solvent of ethylene carbonate (EC)/ethyl methyl carbonate (EMC) was mixed uniformly in a volume ratio of 3/7, 12.5% of lithium salt of $LiPF_6$ was added to dissolve in the organic solvent and stirred uniformly to obtain the electrolyte solution of Example 1.

[Separator]

A polypropylene film was used as the separator.

Example 2

Except that the organic bonding material was changed to sodium alginate, and mass of the added sodium alginate and lithium manganate was changed to 1.09 g and 100 g, other steps in Example 2 were the same as those in Example 1.

Example 3

Except that the organic bonding material was changed to sodium polyacrylate, other steps in Example 3 were the same as those in Example 2.

Examples 4-10

Except that mass of the organic bonding material was changed to 0.008 g, 0.01 g, 0.3 g, 0.68 g, 1.9 g, 5 g, and 5.5 g, respectively, and mass of the added lithium manganate (LMO) was 100 g, other steps in Examples 4 to 10 were the same as those in Example 1.

Examples 11-21

Except that mass of the silicate and oxalate were changed to 0.08 g, 0.1 g, 0.5 g, 1 g, 3 g, 6 g, 8 g, 10 g, 15 g, 20 g, and 22 g, respectively, and mass of the added lithium manganate (LMO) was 100 g, other steps in Examples 11 to 21 were the same as those in Example 2.

Examples 22-30

Except that the mass ratio of silicate to oxalate was changed to 0.001:1, 0.01:1, 0.1:1, 1:1, 10:1, 50:1, 90:1, 95:1, and 200:1 respectively, other steps in Examples 22 to 30 were the same as those in Example 3.

Example 31

Except that 3 g of potassium lactate (by $C_3H_5KO_3$), 3 g of potassium phosphate (by $K_3PO_4$), and 6.8 g of sodium carboxymethyl cellulose were used, other steps were the same as those in Example 1.

Examples 32-33

Except that the A-type salt was changed to potassium tartrate and potassium edetate, respectively, other steps were the same as those in Example 31.

Example 34

Except that the B-type salt was changed to potassium sulfate, other steps were the same as those in Example 31.

Examples 35-37

Except that only potassium phosphate, potassium lactate, and potassium tartrate were used respectively, and the organic bonding material was carboxymethyl chitosan, other steps were the same as those in Example 31.

Comparative Example 1

An unmodified lithium manganate was used directly as a positive electrode active material, the lithium manganate, an ternary NCM (nickel-cobalt-manganese) material, a conductive agent carbon black, a binder polyvinylidene fluoride (PVDF) and a solvent N-methyl pyrrolidone (NMP) were sufficiently stirred and sufficiently mixed at a weight ratio of 67.34:30:28.86:2.7:1.1 to provide a positive electrode slurry. Then, the positive electrode slurry was uniformly coated on a positive electrode current collector, and then oven dried, cold pressed, and slit to provide a positive electrode sheet in the comparative example.

[Preparation of Lithium-Ion Battery]

The positive electrode sheet, the separator and the negative electrode sheet of Example 1 were stacked in sequence, so that the separator was positioned between the positive electrode sheet and the negative electrode sheet and functioned to separate, and then a bare battery cell was obtained by winding, a tab was welded to the bare battery cell, the bare battery cell was put into an aluminum case, baked at 80° C. to remove water, and then the electrolyte solution was injected, and an uncharged battery was obtained after sealing. The uncharged battery then went through procedures such as standing, hot and cold pressing, chemical formation, reshaping and capacity testing successively to obtain the lithium-ion battery product of Example 1.

The lithium-ion battery products in Comparative Example 1 and Examples 2 to 37 were also prepared in accordance with the above steps.

[Test of the Relevant Parameters of Lithium Manganate Positive Electrode Active Material]

Relevant parameters of the lithium manganate positive electrode active materials of the Examples and Comparative example of the present application were tested as follows:

1. Volume Average Particle Size D50 Test

Equipment model: Melvin 2000 (MasterSizer 2000) Laser Particle Sizer, reference standard process: GB/T19077-2016/ISO 13320:2009, specific test process: taking an appropriate amount of the sample to be tested (the sample concentration should guarantee 8-12% shading degree), adding 20 ml of deionized water, at the same time, performing external ultrasonic treatment for 5 min (53 KHz/120 W) to ensure that the sample was completely dispersed, and then testing the sample according to GB/T19077-2016/ISO 13320:2009 Standard.

2. Morphology Test

The lithium manganate positive electrode active materials of all Examples and Comparative example were tested using a ZEISS sigma 300 scanning electron microscope, and then tested according to the standard JY/T010-1996, and the morphology of the sample was observed.

It should be noted here that the shape of the lithium manganate matrix used in the present disclosure was not necessarily spherical, and possibly irregular, and it might be a primary particle or a secondary particle. The D50 of the lithium manganate matrix used in the application was 12 μm. It should also be noted that the shape of the modified lithium manganate positive electrode active material prepared in the present disclosure was not necessarily spherical, and possibly irregular.

3. Cladding Layer Thickness Test

An electrode sheet before cold pressing was cut with scissors into samples of 6 cm*6 cm, and then polished using IB-19500CP cross section polisher to provide polished samples with cut surfaces. The samples were then tested with ZEISS sigma 300 device in accordance with the standard JY/T010-1996. 10 different positions were randomly selected in the test sample for testing, and averaged to obtain the thickness of the cladding layer.

[Battery Performance Test]

1. Battery Capacity Retention Rate Test

Figure 4:
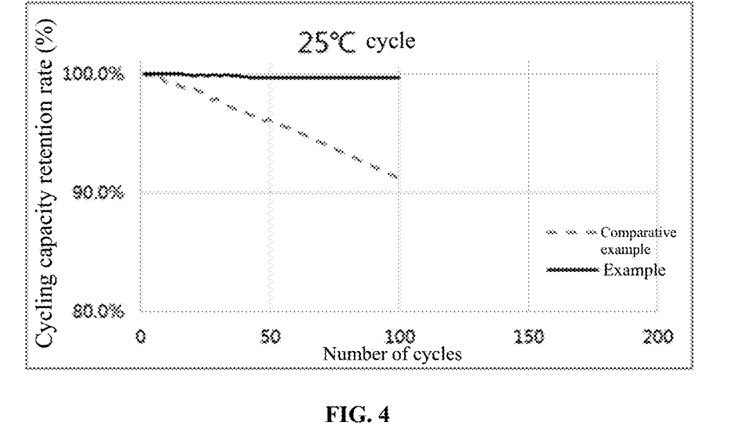
FIG. 4 is a graph of battery capacity retention rate versus number of cycles corresponding to lithium manganate positive electrode active materials of Example 1 and Comparative example 1 of the present disclosure.

Taking Example 1 as an example, testing process of the battery capacity retention rate was as follows: at 25° C., the battery corresponding to Example 1 was charged to 4.3 V at a constant current of ⅓ C, and then charged to a current of 0.05 C at a constant voltage of 4.3 V, laid aside for 5 min, and then discharged to 2.8 V at ⅓ C. The resulting capacity was denoted as an initial capacity C0. The above steps were repeated for the same battery above, and the discharge capacity Cn of the battery after the nth cycle was recorded at the same time, then the battery capacity retention rate after each cycle $Pn=Cn/C0*100\%$; with the 100 point values of $P_1, P_2 \ldots P_{100}$ as the ordinates, and the corresponding number of cycles as the abscissas, a graph of capacity retention rate vs number of cycles of the battery corresponding to the lithium manganate positive electrode active material of example 1, as shown in FIG. 4.

During the test, the first cycle corresponded to n=1, the second cycle corresponded to n=2, . . . and the 100th cycle corresponded to n=100. The data of battery capacity retention rate corresponding to Example 1 in Table 1 was the data measured after 100 cycles under the above test conditions, that is, the value of P100. The test procedures for Comparative Example 1 and other examples were the same as above.

2. Battery DC Impedance Test

Figure 5:
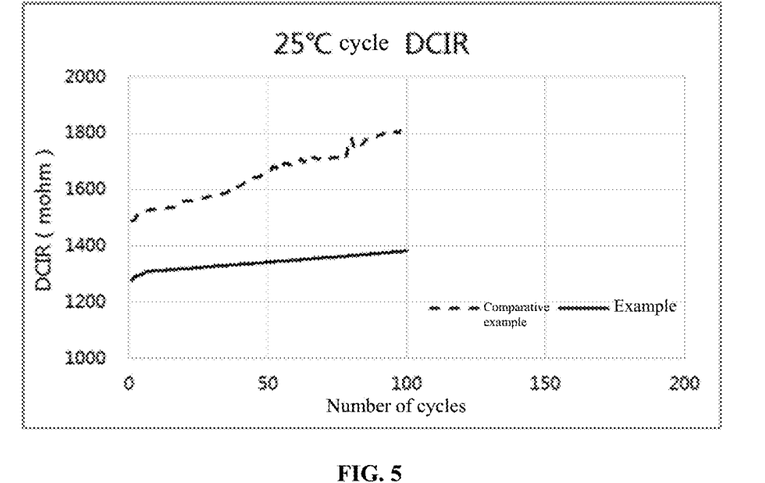
FIG. 5 is a graph of battery discharge DCIR (Direct Current Internal Resistance) versus number of cycles corresponding to lithium manganate positive electrode active materials of Example 1 and Comparative example 1 of the present disclosure.

Taking Example 1 as an example, testing process of the battery DC impedance was as follows: at 25° C., the battery corresponding to Example 1 was charged to 4.3 V at a constant current of ⅓ C, and then charged to a current of 0.05 C at a constant voltage of 4.3 V, and laid aside for 5 min. Then, the voltage was denoted as V1. Then, the battery was discharged at ⅓ C for 30 s, the voltage was denoted as V2, and (V2−V1)/⅓C, thus providing an internal resistance DCR1 of the battery after the first cycle. The above steps were repeated for the same battery as mentioned above, and the internal resistance $DCR_n$ (n=1, 2, 3, . . . , and 100) of the battery after the n-th cycle was denoted. A graph of the battery discharge DCIR and the number of cycles corresponding to the lithium manganate positive electrode active material in Example 1 as shown in FIG. 5 was obtained with the 100 point values of $DCR_1$, $DCR_2$, $DCR_3$, . . . , and $DCR_{100}$ as the ordinates, and with the corresponding number of cycles as the abscissas.

During the test, the first cycle corresponded to n=1, the second cycle corresponded to n=2, . . . and the 100th cycle corresponded to n=100. In Table 1, the internal resistance increase rate of the battery in Example 1=($DCR_n$-$DCR_1$)/$DCR_1$*100%, and the testing processes in Comparative Example 1 and other examples were the same as above. The data in Table 1 was the data measured after 100 cycles under the above test conditions.

TABLE 1

Relevant parameters list of the lithium-ion batteries of Examples and Comparative example

| | | Cladding layer | | | | | | | Battery performance | |
|---|---|---|---|---|---|---|---|---|---|---|
| No. | Matrix | organic bonding material | A-type salt | B-type salt | Mass ratio of organic bonding material to lithium manganate | Ratio of a mass sum of the A-type salt and the B-type salt to mass of the lithium manganate matrix | Mass ratio of the B-type salt to the A-type salt | Volume average particle size D50/μm | Cladding layer thickness/μm | Capacity retention rate | Internal resistance increase rate |
| Example 1 | $LiMn_2O_4$ | CMC | Potassium oxalate | Potassium silicate | 0.68:100 | 6:100 | 1:1 | 13.0 | 1.00 | 99.7% | 108% |
| Example 2 | $LiMn_2O_4$ | SA | Potassium oxalate | Potassium silicate | 1.09:100 | 6:100 | 1:1 | 13.0 | 1.00 | 99% | 108% |
| Example 3 | $LiMn_2O_4$ | PAAS | Sodium oxalate | Sodium silicate | 0.68:100 | 6:100 | 1:1 | 13.0 | 1.00 | 98% | 110% |
| Example 4 | $LiMn_2O_4$ | CMC | Potassium oxalate | Potassium silicate | 0.008:100 | 6:100 | 1:1 | 12.1 | 0.005 | 93% | 120% |
| Example 5 | $LiMn_2O_4$ | CMC | Potassium oxalate | Potassium silicate | 0.01:100 | 6:100 | 1:1 | 12.1 | 0.01 | 96% | 115% |
| Example 6 | $LiMn_2O_4$ | CMC | Potassium oxalate | Potassium silicate | 0.30:100 | 6:100 | 1:1 | 12.5 | 0.45 | 99% | 110% |
| Example 7 | $LiMn_2O_4$ | CMC | Potassium oxalate | Potassium silicate | 0.68:100 | 6:100 | 1:1 | 13.0 | 1.00 | 99.7% | 108% |
| Example 8 | $LiMn_2O_4$ | CMC | Potassium oxalate | Potassium silicate | 1.90:100 | 6:100 | 1:1 | 13.5 | 1.50 | 99% | 110% |
| Example 9 | $LiMn_2O_4$ | CMC | Potassium oxalate | Potassium silicate | 5.00:100 | 6:100 | 1:1 | 17.0 | 5.00 | 95% | 115% |
| Example 10 | $LiMn_2O_4$ | CMC | Potassium oxalate | Potassium silicate | 5.50:100 | 6:100 | 1:1 | 20.0 | 8.00 | 93% | 119% |
| Example 11 | $LiMn_2O_4$ | SA | Potassium oxalate | Potassium silicate | 1.09:100 | 0.08:100 | 1:1 | 12.7 | 0.70 | 94% | 120% |
| Example 12 | $LiMn_2O_4$ | SA | Potassium oxalate | Potassium silicate | 1.09:100 | 0.1:100 | 1:1 | 12.9 | 0.90 | 95% | 117% |
| Example 13 | $LiMn_2O_4$ | SA | Potassium oxalate | Potassium silicate | 1.09:100 | 0.5:100 | 1:1 | 12.8 | 0.80 | 97% | 118% |
| Example 14 | $LiMn_2O_4$ | SA | Potassium oxalate | Potassium silicate | 1.09:100 | 1:100 | 1:1 | 12.8 | 0.80 | 99% | 115% |
| Example 15 | $LiMn_2O_4$ | SA | Potassium oxalate | Potassium silicate | 1.09:100 | 3:100 | 1:1 | 12.9 | 0.90 | 99% | 113% |
| Example 16 | $LiMn_2O_4$ | SA | Potassium oxalate | Potassium silicate | 1.09:100 | 6:100 | 1:1 | 13.0 | 1.00 | 99% | 108% |
| Example 17 | $LiMn_2O_4$ | SA | Potassium oxalate | Potassium silicate | 1.09:100 | 8:100 | 1:1 | 13.1 | 1.10 | 98% | 114% |
| Example 18 | $LiMn_2O_4$ | SA | Potassium oxalate | Potassium silicate | 1.09:100 | 10:100 | 1:1 | 13.3 | 1.30 | 98% | 113% |
| Example 19 | $LiMn_2O_4$ | SA | Potassium oxalate | Potassium silicate | 1.09:100 | 15:100 | 1:1 | 13.4 | 1.40 | 96% | 117% |
| Example 20 | $LiMn_2O_4$ | SA | Potassium oxalate | Potassium silicate | 1.09:100 | 20:100 | 1:1 | 13.7 | 1.70 | 95% | 116% |
| Example 21 | $LiMn_2O_4$ | SA | Potassium oxalate | Potassium silicate | 1.09:100 | 22:100 | 1:1 | 14.2 | 2.20 | 94% | 120% |
| Example 22 | $LiMn_2O_4$ | PAAS | Potassium oxalate | Potassium silicate | 0.68:100 | 6:100 | 0.001:1 | 12.9 | 0.90 | 93% | 117% |
| Example 23 | $LiMn_2O_4$ | PAAS | Potassium oxalate | Potassium silicate | 0.68:100 | 6:100 | 0.01:1 | 12.7 | 0.70 | 97% | 114% |
| Example 24 | $LiMn_2O_4$ | PAAS | Potassium oxalate | Potassium silicate | 0.68:100 | 6:100 | 0.1:1 | 13.1 | 1.10 | 97% | 110% |
| Example 25 | $LiMn_2O_4$ | PAAS | Potassium oxalate | Potassium silicate | 0.68:100 | 6:100 | 1:1 | 13.0 | 1.00 | 98% | 110% |
| Example 26 | $LiMn_2O_4$ | PAAS | Potassium oxalate | Potassium silicate | 0.68:100 | 6:100 | 10:1 | 12.6 | 0.60 | 99% | 108% |

TABLE 1-continued

Relevant parameters list of the lithium-ion batteries of Examples and Comparative example

| | | Cladding layer | | | | | | | Battery performance | |
|---|---|---|---|---|---|---|---|---|---|---|
| No. | Matrix | organic bonding material | A-type salt | B-type salt | Mass ratio of organic bonding material to lithium manganate | Ratio of a mass sum of the A-type salt and the B-type salt to mass of the lithium manganate matrix | Mass ratio of the B-type salt to the A-type salt | Volume average particle size D50/μm | Cladding layer thickness/ μm | Capacity retention rate | Internal resistance increase rate |
| Example 27 | $LiMn_2O_4$ | PAAS | Potassium oxalate | Potassium silicate | 0.68:100 | 6:100 | 50:1 | 12.8 | 0.80 | 99% | 109% |
| Example 28 | $LiMn_2O_4$ | PAAS | Potassium oxalate | Potassium silicate | 0.68:100 | 6:100 | 90:1 | 12.5 | 0.50 | 98% | 110% |
| Example 29 | $LiMn_2O_4$ | PAAS | Potassium oxalate | Potassium silicate | 0.68:100 | 6:100 | 95:1 | 12.9 | 0.90 | 97% | 113% |
| Example 30 | $LiMn_2O_4$ | PAAS | Potassium oxalate | Potassium silicate | 0.68:100 | 6:100 | 200:1 | 13.2 | 1.20 | 94% | 118% |
| Example 31 | $LiMn_2O_4$ | CMC | Potassium lactate | Potassium phosphate | 0.68:100 | 6:100 | 1:1 | 13.3 | 0.13 | 96% | 112% |
| Example 32 | $LiMn_2O_4$ | CMC | Potassium tartrate | Potassium phosphate | 0.68:100 | 6:100 | 1:1 | 13.4 | 0.14 | 95% | 113% |
| Example 33 | $LiMn_2O_4$ | CMC | Potassium edetate | Potassium phosphate | 0.68:100 | 6:100 | 1:1 | 13.2 | 0.13 | 96% | 112% |
| Example 34 | $LiMn_2O_4$ | CMC | Potassium lactate | Potassium sulfate | 0.68:100 | 6:100 | 1:1 | 13.1 | 0.11 | 95.5% | 114% |
| Example 35 | $LiMn_2O_4$ | CMCS | / | Potassium phosphate | 0.68:100 | 3:100 | / | 13.1 | 0.05 | 95% | 117% |
| Example 36 | $LiMn_2O_4$ | CMCS | Potassium lactate | / | 0.68:100 | 3:100 | / | 13.0 | 0.07 | 94% | 116% |
| Example 37 | $LiMn_2O_4$ | CMCS | Potassium tartrate | / | 0.68:100 | 3:100 | / | 13.1 | 0.08 | 94% | 118% |
| Comparative Example 1 | $LiMn_2O_4$ | / | / | / | / | / | / | / | / | 90% | 124% |

Note:
CMC, SA, PAAS, and CMCS represent sodium carboxymethyl cellulose, sodium alginate, sodium polyacrylate, and carboxymethyl chitosan, respectively.

As can be seen from Table 1, the corresponding battery capacity retention rate of the lithium-ion batteries in Examples 1 to 37 is significantly higher than that in Comparative Example 1, and the battery increase rate is significantly lower than that in Comparative Example 1.

According to Table 1, comprehensive comparison between Example 1 and Examples 4 to 10 shows that: when the mass ratio of the organic bonding material to lithium manganate is in the range of (0.01-5):100 (corresponding to Examples 1, and 5 to 9), the corresponding battery capacity retention rate is more than 95%, and the internal resistance increase rate is less than 115%. In particular, when the mass ratio of the organic bonding material to lithium manganate is in the range of (0.3-2):100 (corresponding to Examples 6 to 8), the corresponding electrical performance effect of the battery is better, the battery capacity retention rate is more than 99%, and the internal resistance increase rate is less than or equal to 110%. However, when the mass ratio of the organic bonding material to lithium manganate is lower than 0.01:1 (corresponding to Example 4) or when the ratio is higher than 5:100 (corresponding to Example 10), the corresponding capacity retention rate of the lithium-ion battery is lower than 95%, and the internal resistance increase rate is also more than 115%.

According to Table 1, comprehensive comparison between Example 2 and Examples 11 to 21 shows that: when the ratio of the mass sum of the oxalate and the silicate to the mass of lithium manganate is in the range of (0.1-20):100 (corresponding to Examples 2 and 12 to 20), the corresponding battery capacity retention rate is more than 95%, and the internal resistance increase rate is less than 120%. In particular, when the ratio of the mass sum of the oxalate and the silicate to the mass of lithium manganate is in the range of (1-10):100 (corresponding to Examples 14 to 18), the corresponding electrical performance effect of the battery is better, the battery capacity retention rate is more than 98%, and the internal resistance increase rate is less than or equal to 115%. However, when the ratio of the mass sum of the oxalate and the silicate to the mass of lithium manganate is lower than 0.1:100 (corresponding to Example 11) or when the ratio is higher than 20:100 (corresponding to Example 21), the corresponding capacity retention rate of the lithium-ion battery is lower than 95%, and the internal resistance increase rate is more than 120%.

According to Table 1, comprehensive comparison between Example 3 and Examples 22 to 30 shows that: when the mass ratio of the silicate to the oxalate is in the range of (0.01-95):1 (corresponding to Examples 3, and 23 to 29), the corresponding battery capacity retention rate is more than 95%, and the internal resistance increase rate is less than 115%. In particular, when the mass ratio of the silicate to the oxalate is in the range of (1-50):1 (corresponding to Examples 25 to 27), the corresponding electrical performance effect of the battery is better, the battery capacity retention rate is more than 98%, and the internal resistance increase rate is less than or equal to 110%. However, when the mass ratio of the silicate to the oxalate is lower than 0.01:1 (corresponding to Example 22) or when the ratio is higher than 95:1 (corresponding to Example 30), the corresponding capacity retention rate of the lithium-ion battery will be lower than 95%, and the internal resistance increase rate will be more than 115%.

According to Table 1, comprehensive comparison between Example 4, Example 10, and other examples shows that: when the thickness of the cladding layer is in the range from 0.01 to 5 μm, the battery capacity retention rate is more than 94%, and the internal resistance increase rate is lower than 120%. However, when the thickness of the cladding layer is 0.005 μm (Example 4) or the thickness of the cladding layer is 8 μm (Example 10), the battery capacity retention rate is only 93%, and the internal resistance increase rate is close to or even more than 120%.

According to Table 1, comprehensive comparison between Examples 31 to 37 and Comparative Example 1 shows that: compared to Comparative Example 1, use of the organic CMC or CMCS and one or more salts can improve the corresponding cycling capacity retention rate of the battery and reduce the internal resistance increase rate; at the same time, the battery capacity retention rate is higher, and the internal resistance increase rate is lower when using both the A-type salt and the B-type salt than when using potassium phosphate (Example 35) or potassium lactate or potassium tartrate (Examples 36 to 37) alone.

It should be noted that the present disclosure is not limited to the above-mentioned embodiments. The above-mentioned embodiments are only for illustration, and within the technical solution of the present disclosure, embodiments having substantially the same configuration as the technical idea and exerting the same effects are all included within the technical scope of the present disclosure. In addition, various modifications to the embodiments that can be conceived by those skilled in the art without departing from the scope of the spirit of the present disclosure and other embodiments constructed by combining some constituent elements in the embodiments are also included in the scope of the present disclosure.

The invention claimed is:

1. A lithium manganate positive electrode active material, comprising a lithium manganate matrix and a cladding layer, the cladding layer cladding the lithium manganate matrix;
the cladding layer comprising:
   an organic bonding material;
   one or more A-type salts selected from the group consisting of oxalate, lactate, tartrate, and edetate; and
   one or more B-type salts selected from the group consisting of silicate, sulfate, and phosphate.

2. The lithium manganate positive electrode active material according to claim 1, wherein,
the organic bonding material is selected from one or more of the group consisting of carboxymethyl cellulose salt, alginate, and polyacrylate.

3. The lithium manganate positive electrode active material according to claim 1, wherein,
the organic bonding material is selected from one or more of the group consisting of styrene butadiene rubber, polyacrylic acid, polyacrylamide, polyvinyl alcohol, polymethacrylic acid, and carboxymethyl chitosan.

4. The lithium manganate positive electrode active material according to claim 1, wherein,
a mass ratio of the organic bonding material to the lithium manganate matrix is (0.01-5):100.

5. The lithium manganate positive electrode active material according to claim 1, wherein,
a ratio of a mass sum of the one or more A-type salts and the one or more B-type salts to mass of the lithium manganate matrix is (0.1-20):100.

6. The lithium manganate positive electrode active material according to claim 1, wherein,
a mass ratio of the B-type salt to the A-type salt is (0.01-95):1.

7. The lithium manganate positive electrode active material according to claim 1, wherein a volume average particle size D50 of the positive electrode active material is from 12 μm to 20 μm.

8. The lithium manganate positive electrode active material according to claim 1, wherein the cladding layer has a thickness from 0.01 μm to 5 μm.

9. A method for preparing a lithium manganate positive electrode active material, comprising:
   preparing a cladding slurry, the cladding slurry comprising an organic bonding material, one or more A-type salts, and one or more B-type salts; and
   mixing the cladding slurry with lithium manganate, oven drying and pulverizing the mixture to provide the lithium manganate positive electrode active material with lithium manganate as a matrix and with the cladding slurry as a cladding layer.

10. A positive electrode sheet, wherein
the positive electrode sheet comprises the lithium manganate positive electrode active material of claim 1.

11. The positive electrode sheet according to claim 10, wherein
the positive electrode sheet also comprises a ternary nickel-cobalt-manganese (NCM) material, and the mass ratio of the ternary nickel-cobalt-manganese (NCM) material to the lithium manganate positive electrode active material is 0.01-0.99:1.

12. A secondary battery,
comprising one or more of the lithium manganate positive electrode active material claim 1.

13. A battery module, comprising the secondary battery according to claim 12.

14. A battery pack, comprising one or more of the secondary battery according to claim 12.

15. A powered device, comprising one or more of the secondary battery of claim 12.

* * * * *